(12) United States Patent
Osa

(10) Patent No.: US 6,496,605 B1
(45) Date of Patent: Dec. 17, 2002

(54) BLOCK DEFORMATION REMOVING FILTER, IMAGE PROCESSING APPARATUS USING THE SAME, METHOD OF FILTERING IMAGE SIGNAL, AND STORAGE MEDIUM FOR STORING SOFTWARE THEREFOR

(75) Inventor: Kinya Osa, Chiyoda-ku (JP)

(73) Assignee: United Module Corporation, Los Altos, CA (US)

( * ) Notice: Subject to any disclaimer, the term of this patent is extended or adjusted under 35 U.S.C. 154(b) by 0 days.

(21) Appl. No.: 09/158,109

(22) Filed: Sep. 29, 1998

Related U.S. Application Data

(63) Continuation-in-part of application No. 08/902,330, filed on Jul. 29, 1997.

(30) Foreign Application Priority Data

Aug. 2, 1996 (JP) .............................................. 8-220506
Sep. 26, 1997 (JP) .............................................. 9-279857

(51) Int. Cl.$^7$ .......................... G06K 9/40; H04N 11/02; H04N 5/217
(52) U.S. Cl. ..................... 382/268; 348/420.1; 348/606; 348/618; 382/264; 382/269
(58) Field of Search ........................... 348/409.1, 415.1, 348/417.1, 418.1, 420.1, 422.1, 241, 606, 607, 610, 618, 625, 626, 627, 628, 222; 382/268, 269, 236, 264

(56) References Cited

U.S. PATENT DOCUMENTS 4,805,031 A * 2/1989 Powell ........................ 348/607
5,229,864 A * 7/1993 Moronaga et al. .......... 382/261

(List continued on next page.)

FOREIGN PATENT DOCUMENTS

EP 0808068 A2 * 11/1997 ............ H04N/7/30
JP 03101489 A * 4/1991 ............ H04N/7/13

(List continued on next page.)

OTHER PUBLICATIONS

"Blocking Artifacts Reduction Using Discrete Cosine Transform"; Kasezawa, Tadashi; Feb. 1997; IEEE Transactions on Consumer Electronics; vol. 43, No. 1; pp. 48–55.*
"A New Post–Processing Algorithm to Reduce Artifacts in Block–Coded Images"; Mancuso et al.; Jun. 1997; IEEE.*

*Primary Examiner*—Andrew Christensen
*Assistant Examiner*—John M Villecco
(74) *Attorney, Agent, or Firm*—Connolly Bove Lodge & Hutz, LLP; Larry J. Hume

(57) ABSTRACT

A filter for removing block deformation that occurs in an image signal is disclosed. Detected are a plurality of differentials each between at least two pixel signal levels on block boundaries between pixel blocks and in the vicinity of the block boundaries in response to pixel signals included in a plurality of pixel blocks that form an image. The differentials are compared with each other to obtain the maximum differential absolute value. The maximum differential absolute value is compared with a reference value to determine whether block deformation occurs in a pixel signal in the vicinity of a position on the pixel blocks where the maximum differential absolute value is obtained. The block deformation is removed when it is determined that the block deformation occurs in the pixel signal in the vicinity of the position on the pixel blocks where the maximum differential absolute value is obtained. It is determined that the block deformation occurs when the maximum differential absolute value is smaller than the reference value. A specific value is added to the pixel signal in the vicinity of the position on the pixel blocks where the maximum differential absolute value is obtained when it is determined that the block deformation occurs. A value pattern with the specific value may be selected from a plurality of predefined value patterns based on random numbers. The selected pattern is added to the pixel signal in the vicinity of the position on the pixel blocks where the maximum differential absolute value is obtained.

21 Claims, 7 Drawing Sheets

U.S. PATENT DOCUMENTS

| | | | | |
|---|---|---|---|---|
| 5,337,088 A | * | 8/1994 | Honjo | 348/615 |
| 5,488,673 A | * | 1/1996 | Katayama et al. | 358/465 |
| 5,694,492 A | * | 12/1997 | Kim | 382/262 |
| 5,796,875 A | * | 8/1998 | Read | 382/261 |
| 5,819,035 A | * | 10/1998 | Devaney et al. | 358/465 |
| 5,903,681 A | * | 5/1999 | Rueby et al. | 382/266 |
| 6,389,177 B1 | * | 5/2002 | Chu et al. | 382/168 |

FOREIGN PATENT DOCUMENTS

| | | | | | |
|---|---|---|---|---|---|
| JP | 0418784 A | * | 11/1992 | | H04N/5/92 |
| JP | 08018970 A | * | 1/1996 | | H04N/7/30 |
| JP | 08317389 A | * | 11/1996 | | H04N/7/30 |

BLOCK DEFORMATION REMOVING FILTER, IMAGE PROCESSING APPARATUS USING THE SAME, METHOD OF FILTERING IMAGE SIGNAL, AND STORAGE MEDIUM FOR STORING SOFTWARE THEREFOR

RELATED APPLICATION

This application is a continuation-in-part application of U.S. patent application Ser. No. 08/902,330 filed on Jul. 29, 1997.

BACKGROUND OF THE INVENTION

This invention relates to a block deformation removing filter, an image processing apparatus using the filter and a method of filtering image signals. Particularly, the present invention relates to a block deformation (or blocking noise) removing filter which is used to remove a block deformation (or blocking noise) taking place when for example an image is encoded by compression and the encoded image signal is decoded, and an image processing apparatus using the block deformation removing filter.

When an image is encoded by compression with high efficiency by way of an image compression coding technique, it may often present an image degradation associated with various compression coding techniques. For example, when an image is encoded by compression in units of block by way of the discrete cosine transformation (DCT), the block boundaries may become discontinuous to each another, thus resulting in block deformation.

The possible block deformation is most outstanding image quality degradation in a visual sense when a compression coding technique is applied in units of block, so that the improvement of the image quality requires minimization or removal of such deformation or discontinuity. So far in order to solve this problem, a block deformation removing filter is used to remove block deformation by applying filtering processing on block boundaries.

FIGS. 1A and 1B are illustrations showing how to remove the block deformation by way of a low-pass filter. FIG. 1A shows intensity values of decoded image before filtering, while FIG. 1B after filtering. In this connection, FIGS. 1A and 1B respectively show four scanning lines as representation which cross a block boundary in the image at right angle, and the heights of respective lines show intensity levels or values (shown by solid circles) of pixels lined up on each line.

FIG. 1A shows differentials A in intensity level taking place on every line crossing at right angle with the block boundary shown by a dotted line, where the differentials may be slightly different but essentially same, which cause a discontinuous block boundary resulting in a block deformation. Such a block deformation contributes to assume a mosaic pattern of a decoded image in those points, thus causing a significant visual difficulty.

Therefore, as shown in FIG. 1B, possible differentials Δ in the intensity level at the block boundary are smoothed by way of low-pass filter, thereby taking the straight edge off in intensity value, resulting in a minimized block deformation.

Block deformation may occur not only on block boundaries but also on other positions, for example, when motion compensation is carried out in moving picture coding.

However, a conventional block deformation removing filter can remove block deformation only on the block boundaries. And, hence, no complete removal of block deformation is achieved.

SUMMARY OF THE INVENTION

A purpose. of the present invention is to provide a block deformation removing filter, an image signal processing apparatus with the block deformation removing filter, a method of filtering an image signal, and a storage medium for storing software therefor, to remove block deformation that occurs not only a block boundary but also outside the boundary of an image signal.

The present invention provides a block deformation removing filter comprising: a detector responsive to pixel signals included in a plurality of pixel blocks forming an image to detect a plurality of differentials each between at least two pixel signal levels on block boundaries between the pixel blocks and in the vicinity of the block boundaries; a comparator to compare the differentials with each other to obtain the maximum differential absolute value; a determiner to compare the maximum differential absolute value with a reference value to determine whether block deformation occurs in a pixel signal in the vicinity of a position on the pixel blocks where the maximum differential absolute value is obtained; and a processor to remove the block deformation when it is determined that the block deformation occurs in the pixel signal in the vicinity of the position on the pixel blocks where the maximum differential absolute value is obtained.

Furthermore, the present invention provides an image processing apparatus comprising: a decoder to decode pixel signals included in a plurality of pixel blocks forming an encoded image; a detector responsive to the decoded pixel signals to detect a plurality of differentials each between at least two pixel signal levels on block boundaries between the pixel blocks and in the vicinity of the block boundaries; a comparator to compare the differentials with each other to obtain the maximum differential absolute value; a determiner to compare the maximum differential absolute value with a reference value to determine whether block deformation occurs in a pixel signal in the vicinity of a position on the pixel blocks where the maximum differential absolute value is obtained; and a processor to remove the block deformation when it is determined that the block deformation occurs in the pixel signal in the vicinity of the position on the pixel blocks where the maximum differential absolute value is obtained.

Furthermore, the present invention provides an image processing apparatus comprising: an encoder to encode predictive error signals for pixel signals included in a plurality of pixel blocks forming an encoded image; a decoder to decode the encoded predictive error signals; a detector responsive to the decoded predictive error signals to detect a plurality of differentials each between at least two pixel signal levels on block boundaries between the pixel blocks and in the vicinity of the block boundaries; a comparator to compare the differentials with each other to obtain the maximum differential absolute value; a determiner to compare the maximum differential absolute value with a reference value to determine whether block deformation occurs in a pixel signal in the vicinity of a position on the pixel blocks where the maximum differential absolute value is obtained; a processor to remove the block deformation when it is determined that the block deformation occurs in the pixel signal in the vicinity of the position on the pixel blocks where the maximum differential absolute value is obtained; a predictor to generate predictive signals based on output signals of the processor; and a generator to generate the predictive error signals by subtracting the predictive signals from the pixel signals.

Furthermore, the present invention provides an image processing apparatus comprising: a decoder to decode pixel signals included in a plurality of pixel blocks forming an encoded image; an adder to add the decoded pixel signals and predictive signals; a detector responsive to output signals of the adder to detect a plurality of differentials each between at least two pixel signal levels on block boundaries between the pixel blocks and in the vicinity of the block boundaries; a comparator to compare the differentials with each other to obtain the maximum differential absolute value; a determiner to compare the maximum differential absolute value with a reference value to determine whether block deformation occurs in a pixel signal in the vicinity of a position on the pixel blocks where the maximum differential absolute value is obtained; a processor to remove the block deformation when it is determined that the block deformation occurs in the pixel signal in the vicinity of the position on the pixel blocks where the maximum differential absolute value is obtained; and a predictor to generate the predictive signals based on output signals of the processor.

Furthermore, the present invention provides a method of filtering image signals comprising the steps of: detecting, in response to pixel signals included in a plurality of pixel blocks forming an image, a plurality of differentials each between at least two pixel signal levels on block boundaries between the pixel blocks and in the vicinity of the block boundaries; comparing the differentials with each other to obtain the maximum differential absolute value; comparing the maximum differential absolute value with a reference value to determine whether block deformation occurs in a pixel signal in the vicinity of a position on the pixel blocks where the maximum differential absolute value is obtained; and removing the block deformation when it is determined that the block deformation occurs in the pixel signal in the vicinity of the position on the pixel blocks where the maximum differential absolute value is obtained.

Furthermore, the present invention provides a computer readable storage medium storing a program for causing a computer to filter image signals comprising: a program code, responsive to pixel signals included in a plurality of pixel blocks forming an image, to detect a plurality of differentials each between at least two pixel signal levels on block boundaries between the pixel blocks and in the vicinity of the block boundaries; a program code to compare the differentials with each other to obtain the maximum differential absolute value; a program code to compare the maximum differential absolute value with a reference value to determine whether block deformation occurs in a pixel signal in the vicinity of a position on the pixel blocks where the maximum differential absolute value is obtained; and a program code to remove the block deformation when it is determined that the block deformation occurs in the pixel signal in the vicinity of the position on the pixel blocks where the maximum differential absolute value is obtained.

DETAILED DESCRIPTION OF THE PREFERRED EMBODIMENTS

Figures 1A, 1B:
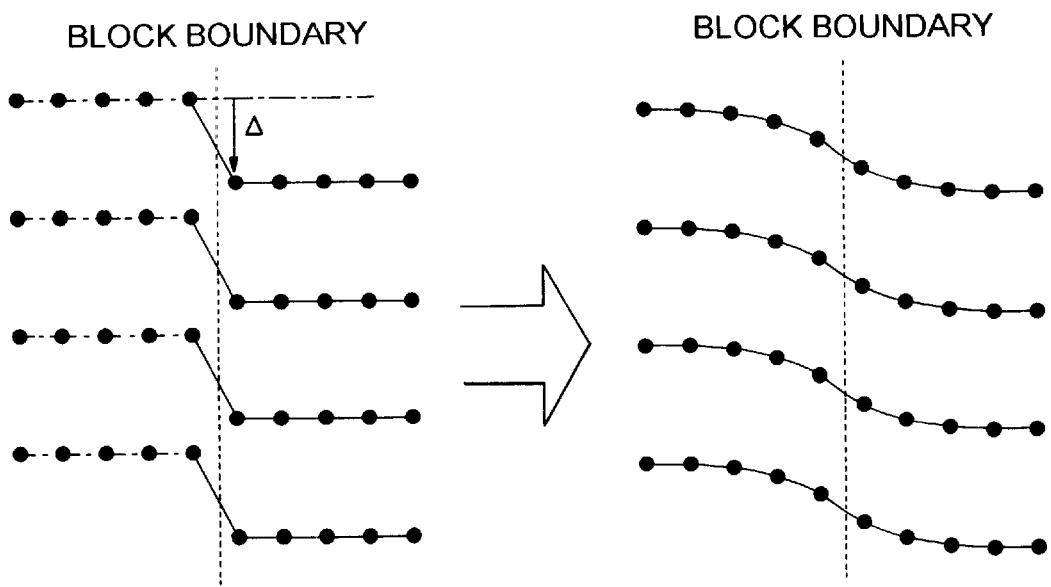
FIGS. 1A and 1B are illustrations showing how the block deformation removing filter of the related art works.
Figure 2:
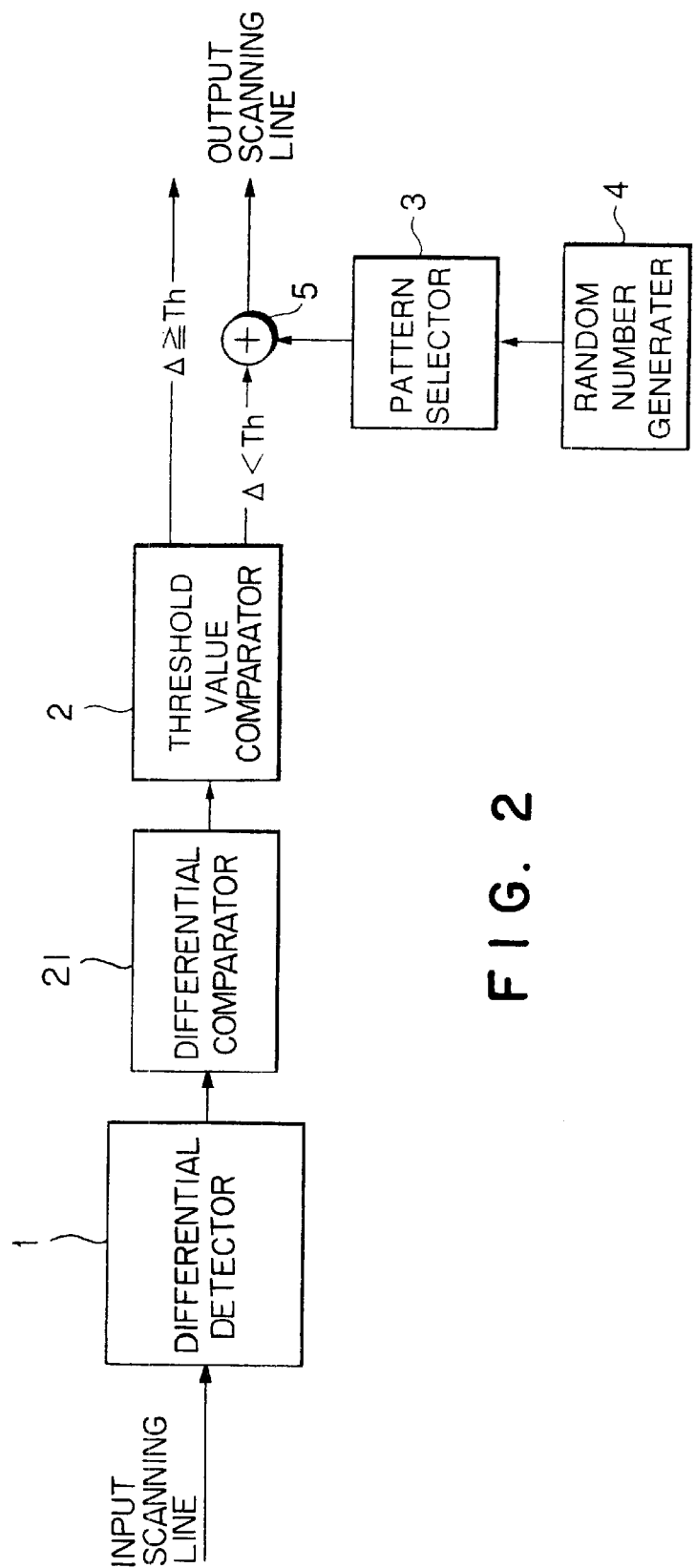
FIG. 2 is a block diagram showing an embodiment of the block deformation removing filter according to the present invention.
Figure 3:
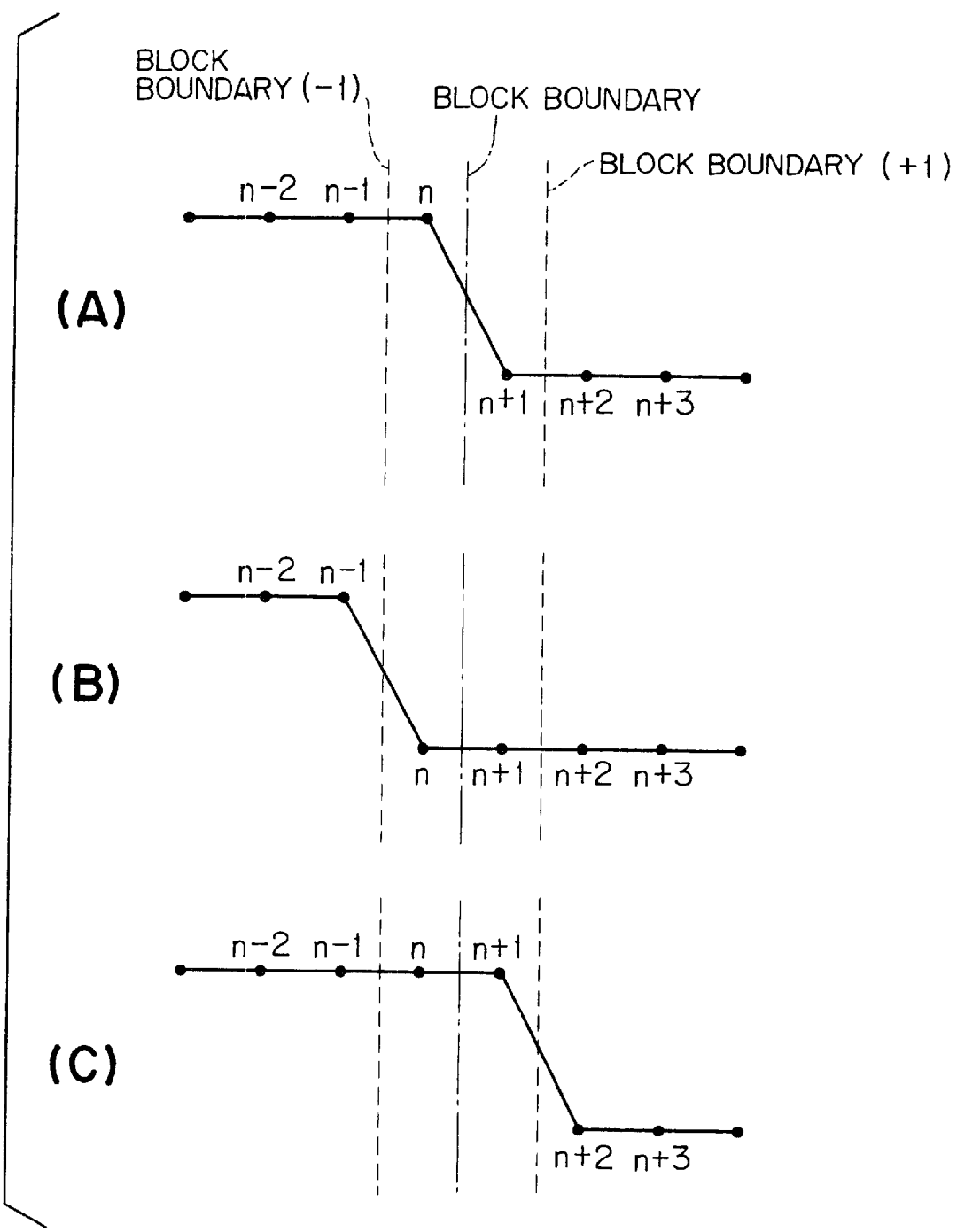
FIGS. 3A to 3C are illustrations showing how the block deformation removing filter according to the invention works to locate block deformation.

FIG. 2 is a block diagram showing an embodiment of the block deformation removing filter according to the present invention. The block deformation removing filter is provided with a differential detector 1, a differential comparator 21, a threshold value comparator 2, a pattern selector 3, a random number generator 4 and an adder 5.

The differential detector 1 detects a plurality of differentials each between two signal values (e.g., intensity signal levels) at adjacent pixels in an image (e.g., a decoded image decoded from an image encoded in units of block by way of e.g., DCT and motion compensation) divided into two or more blocks.

More in detail, the differential detector 1 detects a plurality of differentials, for example, differentials of signal values between pixels on block boundaries, and differentials of signal values between pixels in the vicinity of the block boundaries.

The number of differentials $\Delta$ detected in the embodiment are, for example, the following three:

$$\Delta 1 = X_n - X_{n-1} \tag{1}$$

$$\Delta 2 = X_{n+1} - X_n \tag{2}$$

$$\Delta 3 = X_{n+2} - X_{n+1} \tag{3}$$

where $X_n$ denotes a signal value at a pixel located at a position "n", and a block boundary exists between pixels located at positions "n" and "n+1" on a scanning line when raster scanning is carried out to cross the block boundary at right angle.

In other words, three differentials $\Delta$ are detected on a block boundary and both sides of the boundary in the embodiment.

The differential comparator 21 compares the differentials $\Delta$ detected by the differential detector 1, and outputs the maximum differential absolute value to the threshold value comparator 2.

The threshold value comparator 2 compares the maximum differential absolute value with a predetermined threshold value on the assumption that block deformation occurs at a position where a differential absolute value is the maximum to determine whether block deformation actually occurs, or the block deformation removing process be performed at the position.

The pattern selector 3 randomly selects a value pattern among several patterns of value to be added to signal values or levels of the two or more pixels in the vicinity of a position where block deformation is assumed to occur on a scanning line crossing the block boundary at right angle.

The random number generator 4 generates pseudo random numbers of e.g., two bits. In accordance with the generated random numbers, the pattern selector 3 randomly selects a value pattern among several patterns. The adder 5 adds additional values selected by the pattern selector 3 to respective signal values of pixels in the vicinity of the position where the maximum differential absolute value is detected and block deformation is judged to occur when the threshold value comparator 2 decides that the block deformation removing process be performed.

Detailed description will be made for how the block deformation removing filter shown in FIG. 2 operates referring to FIGS. 3A to 5B as follows:

As already described, block deformation may occur not only on a block boundary but also other positions when, for example, motion compensation is carried out in moving picture coding.

FIG. 3A illustrates block deformation that occurs on a block boundary between pixel positions "n" and "n+1". FIG. 3B illustrates block deformation that occurs on a block boundary (−1) between pixel positions "n−1" and "n". Furthermore, FIG. 3C illustrates block deformation that occurs on a block boundary (+1) between pixel positions "n+1" and "n+2".

In FIG. 3A, the differential Δ2 represented by the expression (2) is the maximum absolute value among the three differentials Δ1, Δ2 and Δ3 detected by the differential detector 1. In FIG. 3B, the differential Δ1 represented by the expression (1) is the maximum absolute value. In FIG. 3C, the differential Δ3 represented by the expression (3) is the maximum absolute value.

Accordingly, a position where the maximum absolute value is obtained depends a position where block deformation occurs.

Figure 4:
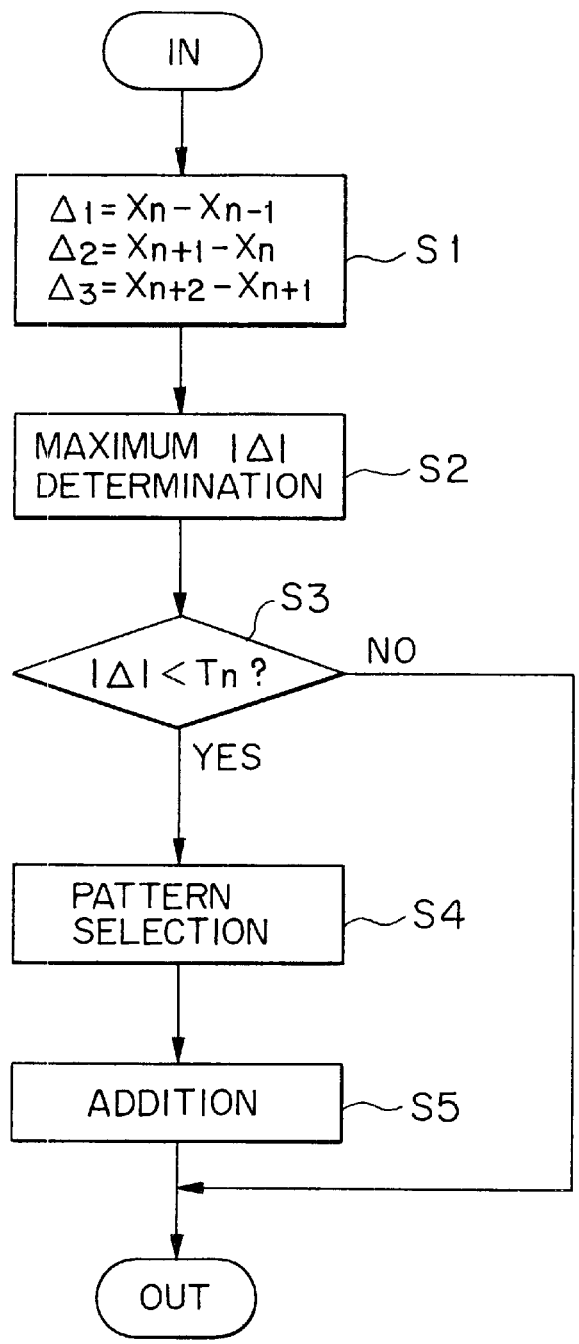
FIG. 4 is a flow chart showing how the block deformation removing filter according to the invention operates.

In Step S1 in FIG. 4, the differentials Δ1, Δ2 and Δ3 are obtained each between two intensity signal levels on a block boundary and its periphery between a pixel blocks that form one image.

Next in Step S2, the differential whose absolute value is the maximum is obtained among the differentials Δ1, Δ2 and Δ3 to judge that block deformation possibly occurs at the position where the maximum differential absolute value is obtained.

An assumption is made that the position where the maximum differential absolute value is obtained is located on a block boundary, and block deformation removing processing is carried out through Steps S3 to S5.

The differential absolute value of intensity signal levels at pixels "n" and "n+1" on the block boundary is expressed as $|\Delta|=|Xn+1-Xn|$.

In Step S3, the threshold value comparator 2 compares the differential absolute value $|\Delta|$ with a predetermined threshold value Th. If the differential absolute value $|\Delta|$ is smaller than the threshold value Th, it is assumed that block deformation occurs. And, the process goes to Step S4.

On the other hand, if the differential absolute value $|\Delta|$ is equal to or larger than the threshold value Th, the difference is assumed as an edge component existing in the original image, to output intensity signal value on the scanning line as it is. And, the process ends.

Block deformation may be a remaining noise basically unexpected, so that in most cases the absolute value of differential Δ is smaller than an edge component possibly existing in the original image. Therefore, the block deformation removing process is to be performed only when the absolute value of differential Δ is smaller than the threshold value Th, while waiver of the removing process is allowed even if the absolute value of differential Δ is equal to or larger than the threshold value Th, because most of possible significant block deformation can be expected to be removed.

This waiver is applied rather by practical choice or preference than by theoretical necessity, because the performance of the removing process in that case may cause noise associated with intensity value randomly taken to be larger, thereby uselessly creating an inadvertent danger for degrading the image quality much more. Therefore, theoretically this process may be applied to the entire block boundaries across the board, but this threshold value comparison process introduced by the present invention can not only successfully remove most of the block deformation, but also can prevent otherwise possible inadvertent degradation of image quality from taking place.

In Step S3, when the threshold value comparator 2 judges that the absolute value of differential Δ is smaller than the threshold value Th, and that there are some block deformation, the process goes to Step S3 where the random number generator 4 generates pseudo random numbers e.g., of two bits. Based on the pseudo random numbers, the pattern selector 3 randomly selects one pattern of an additional value to be added to signal values of two or more pixels (in this case, four pixel values at the pixel positions n−1, n, n+1, n+2) in the vicinity of block boundary on one scanning line among four patterns as shown below

| Pattern | Xn − 1 | Xn | Xn + 1 | Xn + 2 |
|---|---|---|---|---|
| (1) | +Δ | 0 | −Δ | 0 |
| (2) | 0 | +Δ | 0 | −Δ |
| (3) | 0 | +Δ | −Δ | 0 |
| (4) | +Δ | 0 | 0 | −Δ |

And, in Step S5, the adder 5 adds additional values with the pattern selected at the pattern selector 3 to the four pixel values Xn−1, Xn, Xn+1 and Xn+2, to output the additional results. For example, when the pattern (1) is selected, +Δ and −Δ are added to the pixel values Xn−1 and Xn+1, respectively, for output, but pixel values Xn and Xn+2 are output as they are.

As shown in FIG. 3B, when the maximum differential value that seems to be block deformation is obtained at the block boundary (−1), four pixel values to which any pattern described above is added are Xn−2, Xn−2, Xn and Xn+1. Furthermore, as shown in FIG. 3C, when the maximum differential absolute value that seems to be block deformation is obtained at the block boundary (+1), four pixel values to which any pattern described above is added are Xn, Xn+1, Xn+2 and Xn+3.

When the above-described pattern selection and addition processing is over for one scanning line, next scanning line is also subjected to the same routine.

Figure 5A:
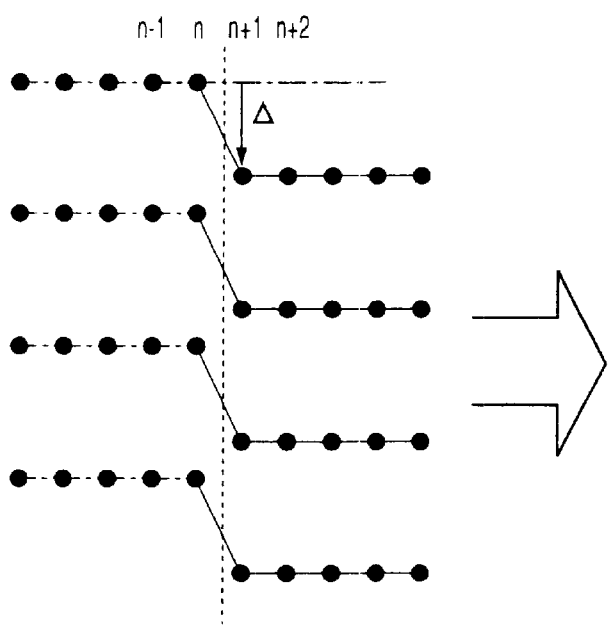
FIGS. 5A and 5B are illustrations showing how the block deformation removing filter according to the invention works when the differential absolute value on block boundary is the maximum.
Figure 5B:
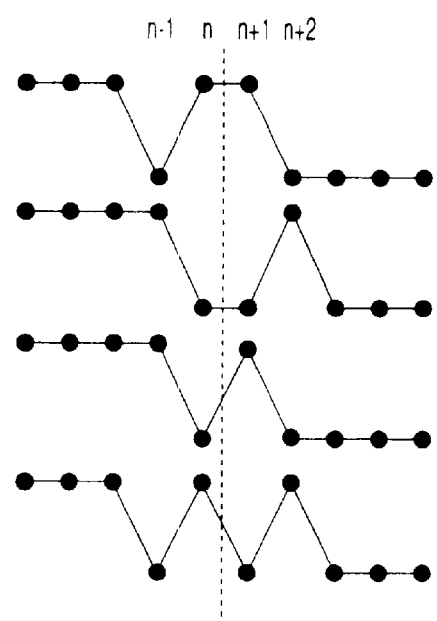

When such routine is successively operated per scanning line (four lines in FIG. 5A), as shown in FIG. 5B, the random selection of patterns on each scanning line can remove straight edges of signal differentials in the block boundary, thus minimizing block deformation.

In this embodiment, a probability of continuously selecting the same pattern for two adjacent scanning lines on the same block boundary (including a block boundary on which block deformation seems to occur in Step S2 of FIG. 4) is ¼. With such block deformation removing filter as used in the embodiment, because this probability is small, block deformation can be effectively removed by way of disturbing the regularity of signal differentials along block boundaries. In this connection, there is a probability of continuous adoption of the same pattern as described above, however, since the probability is small, such continuous adoption may not impose any visual degradation.

With this embodiment, such a block deformation removing process as described above is performed only when the absolute value of differential Δ is smaller than the threshold value Th and at the same time the area to be applied with the process is limited to within a narrow range including two pixels across the block boundary, thereby allowing the block deformation to be removed without significant impairment of high frequency signal component of the original image. In this connection, an image having such intensity signal levels as shown in FIG. 5B shows some disturbance in levels in the vicinity of block boundary, but the small differentials Δ cannot affect its visual appearance.

Furthermore, according to the embodiment, block deformation is removed by way of disturbing the straightness (or regularity) of the edges along the pixel block boundary, thereby, even in a case where the differentials Δ are very small (particularly for Δ=1), resulting in an effective removal of block deformation.

In detail, block deformation removing processing with a low-pass filter would remove not only block deformation but also high frequency components of the original image, thus resulting a dim image.

A low-pass filter blunts only a small portion of a linear edge represented by a small differential absolute value |Δ|, and hence cannot effectively remove block deformation. Particularly, a low-pass filter cannot remove block deformation at all from an image with 256-gradation in intensity if a differential absolute value is only 1 in the image because of no intermediate value between the differential absolute value.

On the contrary, according to the embodiment, block deformation is removed by way of disturbing the straightness (or regularity) of the edges along the pixel block boundary, thereby, even in a case where the differentials Δ are very small, resulting in an effective removal of block deformation.

The differential detector 1 in this embodiment detects three differential values on a block boundary and both sides of the boundary. This invention however is not limited to three. The number of differential values detected on both sides of a block boundary may be five, seven or more. The more the number of differential values to be detected, the larger the area to be covered to detect block deformation, resulting in a further effective removal of block deformation.

Objects to be processed by the block deformation removing processing when it is judged that block deformation has occurred may not be limited to two pixels across the boundary. Three or more pixels may have a higher probability with which the same pattern will not be selected, thus resulting in a enhanced removing performance.

As described above, according to the embodiment, block deformation is removed by way of disturbing the straightness (or regularity) of the edges along the pixel block boundary. The present invention however is not limited to this.

A feature of the invention is that a plurality of differential values are obtained in the vicinity of a block boundary and a differential value for which the absolute value is the maximum is detected to locate block deformation. The present invention can therefore employ not only a low-pass filter but also other well known methods to remove block deformation.

Block deformation which can be removed by this embodiment has a direction crossing a scanning line at right angle (a horizontal scanning line with respect to an image) as shown in FIGS. 5A and 5B. Therefore, in the case of a rectangle pixel block, a cascade operation along with the processing for a vertical scanning line can treat block deformations both in horizontal and vertical directions.

This block deformation removing in horizontal and vertical directions according to the present invention will be described with reference to FIG. 6.

Figure 6:
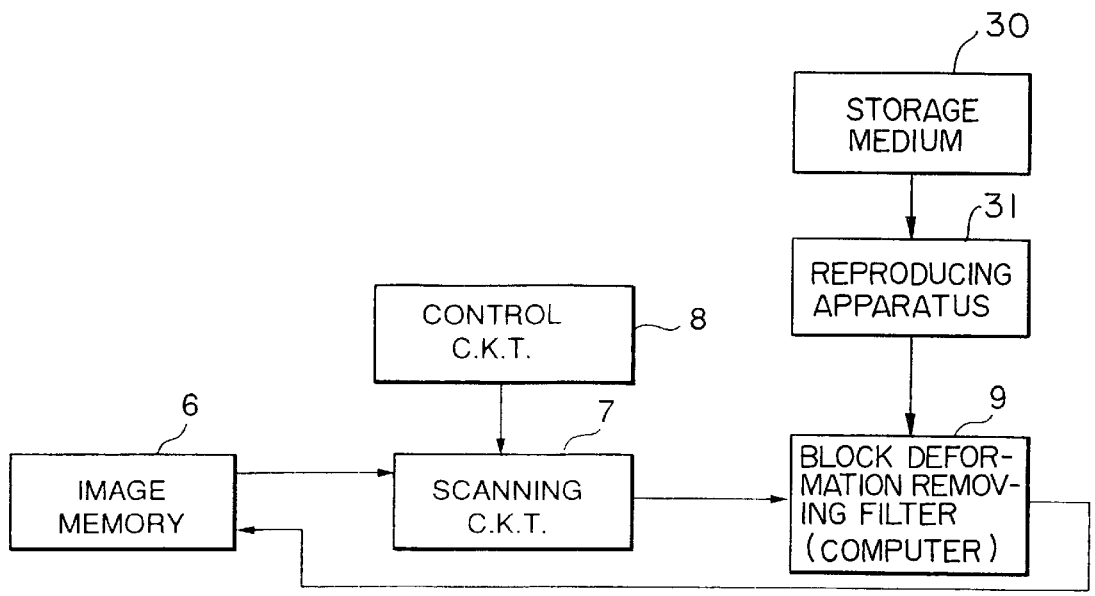
FIG. 6 is a block diagram showing an example in application of the block deformation removing filter according to the present invention to image signal processing.

The system shown in FIG. 6 includes an image memory 6, a scanning circuit 7, a control circuit 8 and a block deformation removing filter 9. The image memory 6 stores input image signals. The scanning circuit 7 scans the image signals in a horizontal and a vertical direction to output intensity signals of the image. The control circuit 8 controls the scanning circuit 7 to scan the image signals in which of the directions. The block deformation removing filter 9 is constituted, for example, by the circuits shown in FIG. 2.

Image signals of a decoded image stored in the image memory 6 are supplied to the scanning circuit 7. The scanning circuit 7 is switched by the control circuit 8 between the horizontal and vertical scanning modes.

Firstly, the scanning circuit 7 is switched to the horizontal scanning mode. Signals such as intensity signals per horizontal scanning line are supplied to the block deformation removing filter 9 according to the present invention. The intensity signals are processed by the block deformation removing filter 9 as described above with reference to FIGS. 3A to 5B.

The processed signals (in which block deformation in the horizontal direction is removed) are feedback to the image memory 6 and again supplied to the scanning circuit 7. The scanning circuit 7 is next switched to the vertical scanning mode by the control circuit 8. The signals per vertical scanning line are supplied to the block deformation removing filter 9 and processed again the same as described with reference to FIGS. 3A to 5B.

The description made with reference to FIG. 6 is for the case that the horizontal block deformation removing is conducted first and the vertical block deformation removing next. However, the vertical block deformation removing can be conducted first.

Here, FIGS. 3A to 5B, particularly FIGS. 5A and 5B show the case of horizontal scanning. The block deformation removing in vertical scanning is the same as that of horizontal scanning and hence drawings thereof are omitted here.

Now detailed description will be made for applications of the block deformation removing filter according to the present invention, when used for still picture encoding, motion picture encoding with/without prediction, referring to FIGS. 7, 8 and 9.

Figure 7:
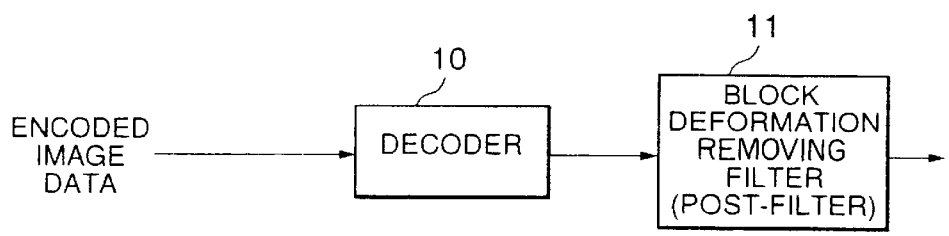
FIG. 7 is a block diagram showing a preferable application embodiment of the block deformation removing filter according to the present invention.

FIG. 7 is a block diagram showing an embodiment of the block deformation removing filter according to the invention, when used for still picture encoding or motion picture encoding without prediction. FIGS. 8 and 9 are block diagrams showing encoding and decoding systems using embodiments of the block deformation removing filter according to the invention, when used for motion picture encoding with prediction.

As shown in FIG. 7, when used for still picture encoding or motion picture encoding without prediction, in a decoding system, the block deformation removing filter is arranged as a post-filter 11 after a decoder 10. Picture data encoded by an encoder (not shown) are decoded at the decoder 10, and then given to the post-filter 11 (block deformation removing filter) to remove block deformation. In this connection, in the case where encoding is made in units of rectangular blocks, the block deformation removing filter according to the invention makes a cascade operation of horizontal scanning line processing along with vertical scanning line processing as shown in FIG. 6.

Furthermore, when used for motion picture encoding with prediction, the decoder 10 and the filter 11 shown in FIG. 7 can be arranged after an encoder (not shown). Alternatively, as shown in FIG. 8, a block deformation filter can be provided as a loop filter 15 for the output of a local decoder 14. In this case, predictive errors encoded by the encoder 13, that is image data, are decoded by the local decoder 14, and block deformation of the decoded image data are eliminated by the loop filter 15 (block deformation removing filter) to be supplied to a predictor 16. Predictive signals generated by the predictor 16 are given to a differentiator 12. The differentiator 12 compares input image signals with the predictive signals, and the differential (predictive error) signals are supplied to the encoder 13.

Figure 8:
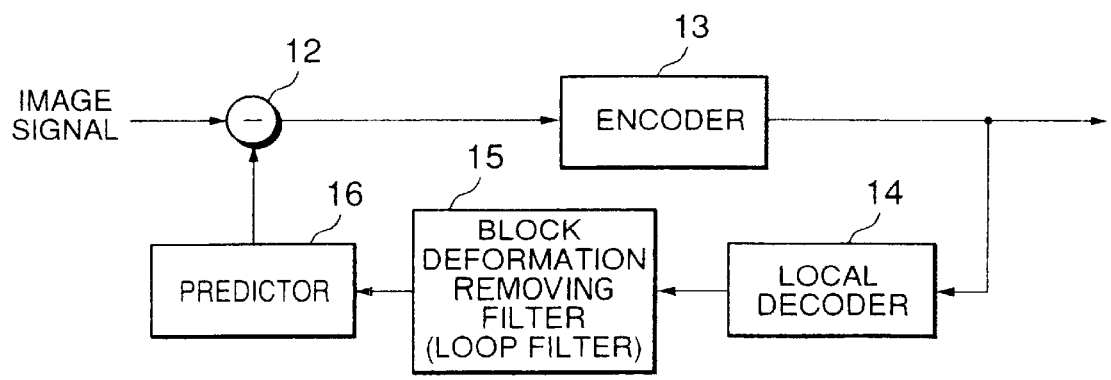
FIG. 8 is a block diagram showing another preferable application embodiment of the block deformation removing filter according to the present invention.
Figure 9:
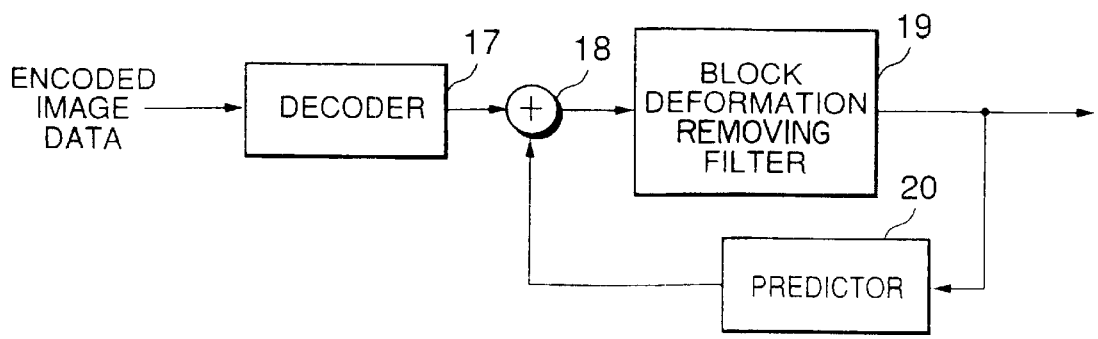
FIG. 9 is a block diagram showing a further preferable application embodiment of the block deformation removing filter according to the present invention.

FIG. 9 shows a configuration of a decoding system accommodating the encoding system shown in FIG. 8. The above-described encoded image data encoded by the encoding system shown in FIG. 8 are decoded by the decoder 17 shown in FIG. 9. The decoded image signals and predictive signals fedback from a predictor 20 are added by an adder 18, and the feedback results are input to a block deformation removing filter 19 according to the present invention, where block deformation is eliminated for again feedbacking to the predictor 20.

Application of the block deformation removing filter according to the invention to both encoding and decoding systems as shown in FIGS. 8 and 9 can obtain much more powerful removing performance than the simple decoding system (shown in FIG. 7) where the filter is used simply as post filter.

The present invention includes software for achieving the embodiment shown in FIG. 2. In this case, since the program codes of the software themselves achieve the embodiments, the program codes themselves and means for supplying the program codes to a computer, for example, a storage medium for storing the program codes constitute the present invention.

In FIG. 6, for instance, the block deformation removing filter 9 may be replaced with a computer 9a (CPU or MPU). And a storage medium 30 and a reproducing apparatus 31 are connected to the computer 9a. The program codes stored in the storage medium 30 are read by the reproducing apparatus 31 to activate the computer 9a as described with reference to FIG. 2.

This is also true for the embodiments shown in FIGS. 7 to 9. The block deformation removing filters 11, 15 and 19 may be replaced with a computer. And the storage medium 30 and the reproducing apparatus 31 shown in FIG. 6 are connected to the computer, thus activating the computer as described with reference to FIG. 2.

As for the storage medium 30 for storing the program codes, a floppy disk, a hard disk, an optical disk, a CD-ROM, a magnetic tape, a non-volatile memory card and a ROM, etc., can be used, for instance.

As described in detail, the block deformation removing filter according to the invention, first, detects a plurality of differentials of at least two pixel signal values or levels in the vicinity of a block boundary between two or more pixel blocks forming an image, and obtains the maximum differential absolute value.

The block deformation removing filter then compares the maximum differential absolute value with a specific threshold value. If the former is smaller than the latter, block deformation removing processing is carried out on the assumption that block deformation occurs at the position where the maximum differential absolute value is detected.

According to the present invention, therefore, even if differentials of pixel signal values or levels are detected outside a block boundary due to block deformation occurring outside the block boundary, the location is detected to carry out block deformation processing, thus block deformation occurring outside the block boundary is also effectively removed.

What is claimed is:

1. A block deformation removing filter comprising:
   a detector responsive to pixel signals included in a plurality of pixel blocks forming an image to detect a plurality of differentials each between at least two pixel signal levels on block boundaries between the pixel blocks and in the vicinity of the block boundaries;
   a comparator to compare the differentials with each other to obtain the maximum differential absolute value;
   a determiner to compare the maximum differential absolute value with a reference value to determine whether block deformation occurs in a pixel signal in the vicinity of a position on the pixel blocks where the maximum differential absolute value is obtained; and
   a processor to remove the block deformation when it is determined that the block deformation occurs in the pixel signal in the vicinity of the position on the pixel blocks where the maximum differential absolute value is obtained.

2. The filter according to claim 1, wherein the determiner determines that the block deformation occurs when the maximum differential absolute value is smaller than the reference value.

3. The filter according to claim 1, wherein the processor adds a specific value to the pixel signal in the vicinity of the position on the pixel blocks where the maximum differential absolute value is obtained when it is determined that the block deformation occurs.

4. The filter according to claim 3, further comprising:
   a generator to generate random numbers; and
   a selector to select a value pattern including the specific value from a plurality of predefined value patterns based on the random numbers,
   wherein the processor adds the selected pattern to the pixel signal in the vicinity of the position on the pixel blocks where the maximum differential absolute value is obtained.

5. The filter according to claim 4, wherein the random numbers are pseudo random numbers of two bits.

6. The filter according to claim 1, wherein the detector detects a differential between at least two pixel signal levels on the block boundary and differentials each between at least two pixel signal levels on a plurality of positions on both sides of each block boundary.

7. An image processing apparatus comprising:
   a decoder to decode pixel signals included in a plurality of pixel blocks forming an encoded image;
   a detector responsive to the decoded pixel signals to detect a plurality of differentials each between at least two pixel signal levels on block boundaries between the pixel blocks and in the vicinity of the block boundaries;
   a comparator to compare the differentials with each other to obtain the maximum differential absolute value;
   a determiner to compare the maximum differential absolute value with a reference value to determine whether block deformation occurs in a pixel signal in the vicinity of a position on the pixel blocks where the maximum differential absolute value is obtained; and a processor to remove the block deformation when it is determined that the block deformation occurs in the pixel signal in the vicinity of the position on the pixel blocks where the maximum differential absolute value is obtained.

8. An image processing apparatus comprising:

an encoder to encode predictive error signals for pixel signals included in a plurality of pixel blocks forming an encoded image;

a decoder to decode the encoded predictive error signals;

a detector responsive to the decoded predictive error signals to detect a plurality of differentials each between at least two pixel signal levels on block boundaries between the pixel blocks and in the vicinity of the block boundaries;

a comparator to compare the differentials with each other to obtain the maximum differential absolute value;

a determiner to compare the maximum differential absolute value with a reference value to determine whether block deformation occurs in a pixel signal in the vicinity of a position on the pixel blocks where the maximum differential absolute value is obtained;

a processor to remove the block deformation when it is determined that the block deformation occurs in the pixel signal in the vicinity of the position on the pixel blocks where the maximum differential absolute value is obtained;

a predictor to generate predictive signals based on output signals of the processor; and a generator to generate the predictive error signals by subtracting the predictive signals from the pixel signals.

9. An image processing apparatus comprising:

a decoder to decode pixel signals included in a plurality of pixel blocks forming an encoded image;

an adder to add the decoded pixel signals and predictive signals;

a detector responsive to output signals of the adder to detect a plurality of differentials each between at least two pixel signal levels on block boundaries between the pixel blocks and in the vicinity of the block boundaries;

a comparator to compare the differentials with each other to obtain the maximum differential absolute value;

a determiner to compare the maximum differential absolute value with a reference value to determine whether block deformation occurs in a pixel signal in the vicinity of a position on the pixel blocks where the maximum differential absolute value is obtained;

a processor to remove the block deformation when it is determined that the block deformation occurs in the pixel signal in the vicinity of the position on the pixel blocks where the maximum differential absolute value is obtained; and a predictor to generate the predictive signals based on output signals of the processor.

10. A method of filtering image signals comprising the steps of:

detecting, in response to pixel signals included in a plurality of pixel blocks forming an image, a plurality of differentials each between at least two pixel signal levels on block boundaries between the pixel blocks and in the vicinity of the block boundaries;

comparing the differentials with each other to obtain the maximum differential absolute value;

comparing the maximum differential absolute value with a reference value to determine whether block deformation occurs in a pixel signal in the vicinity of a position on the pixel blocks where the maximum differential absolute value is obtained; and removing the block deformation when it is determined that the block deformation occurs in the pixel signal in the vicinity of the position on the pixel blocks where the maximum differential absolute value is obtained.

11. The method according to claim 10, wherein the detecting step includes the step of detecting a differential between at least two pixel signal levels on the block boundary and differentials each between at least two pixel signal levels on a plurality of positions on both sides of each block boundary.

12. The method according to claim 10, wherein the supplying step includes the step of supplying the pixel signals included in the plurality of pixel blocks forming the image for each scanning line.

13. The method according to claim 12 wherein the scanning line is for scanning in a horizontal direction to the image.

14. The method according to claim 12 wherein the scanning line is for scanning in a vertical direction to the image.

15. The method according to claim 10, wherein the supplying step includes the step of supplying the pixel signals included in the plurality of pixel blocks forming the image in a horizontal and a vertical direction to the image; and the detecting step includes the step of, in the horizontal and vertical directions, detecting the plurality of differentials each between at least two pixel signal levels on the block boundaries between the pixel blocks and in the vicinity of the block boundaries.

16. A computer readable storage medium storing a program for causing a computer to filter image signals, comprising:

a program code, responsive to pixel signals included in a plurality of pixel blocks forming an image, to detect a plurality of differentials each between at least two pixel signal levels on block boundaries between the pixel blocks and in the vicinity of the block boundaries;

a program code to compare the differentials with each other to obtain the maximum differential absolute value;

a program code to compare the maximum differential absolute value with a reference value to determine whether block deformation occurs in a pixel signal in the vicinity of a position on the pixel blocks where the maximum differential absolute value is obtained; and a program code to remove the block deformation when it is determined that the block deformation occurs in the pixel signal in the vicinity of the position on the pixel blocks where the maximum differential absolute value is obtained.

17. The storage medium according to claim 16, wherein the determinating program code determines that the block deformation occurs when the maximum differential absolute value is smaller than the reference value.

18. The storage medium according to claim 16, wherein the processing program code adds a specific value to the pixel signal in the vicinity of the position on the pixel blocks where the maximum differential absolute value is obtained when it is determined that the block deformation occurs.

19. The storage medium according to claim 18, further comprising:
- a program code to generate random numbers; and
- a program code to select a value pattern including the specific value from a plurality of predefined value patterns based on the random numbers,
- wherein the processing program code adds the selected pattern to the pixel signal in the vicinity of the position on the pixel blocks where the maximum differential absolute value is obtained.

20. The storage medium according to claim 19, wherein the random numbers are pseudo random numbers of two bits.

21. The storage medium according to claim 16, wherein the detecting program code detects a differential between at least two pixel signal levels on the block boundary and differentials each between at least two pixel signal levels on a plurality of positions on both sides of each block boundary.

* * * * *